United States Patent Office

Re. 24,244
Reissued Dec. 4, 1956

24,244

ALLOYS AND ELECTRICAL RESISTANCE ELEMENTS

James M. Lohr, Morristown, N. J., assignor to Driver-Harris Company, Harrison, N. J., a corporation of New Jersey No Drawing. Original No. 2,687,956, dated August 31, 1954, Serial No. 263,959, December 28, 1951. Application for reissue June 29, 1956, Serial No. 595,043

6 Claims. (Cl. 75—171)

Matter enclosed in heavy brackets [ ] appears in the original patent but forms no part of this reissue specification; matter printed in italics indicates the additions made by reissue.

This invention relates to alloys, and more particularly to alloys for electrical resistance elements. In the manufacture of electrical resistance elements an alloy having the property of resisting oxidation at high temperature is essential. The alloys forming the subject matter of this invention are characterized by ability to resist oxidation and by a prolonged life, exceeding that of other known alloys when used under high temperature conditions. Among the alloys of this type which are extensively used is the alloy of substantially 80 percent nickel and 20 percent chromium. Such alloys are employed for service requirements in which furnace temperatures as high as 2100° F. are encountered. There is, however, a definite demand for alloys which will be useful at still higher temperatures.

Since the introduction of nickel-chromium and nickel-chromium-iron alloys as electrical resistance elements many developments have occurred that have improved their resistance to oxidation. In a number of prior patents I have disclosed and claimed various alloying additions of calcium, zirconium and aluminum, which greatly improve the life of heating elements. It has also been proposed to add rare earth metals, such as cerium, to nickel-chromium-iron alloys to improve the life of the heating elements.

In my copending application, Serial No. 117,510, filed September 23, 1949, now Patent No. 2,581,420, of which this application is a continuation-in-part I have disclosed nickel-chromium-iron alloys containing additions of calcium and aluminum, as well as rare earth metals. Better results are obtained with such alloys that if the calcium-zirconium-aluminum group or the rare earths are added alone. Said application discloses such additions to heat resisting nickel-chromium-iron alloys containing 30 to 70 percent nickel. The claims, however, are directed to residual ranges of the additions in alloys consisting essentially of 50 to 70 percent nickel, 10 to 25 percent chromium and balance essentially iron. In a division [application Serial No. 252,198, filed October 19, 1951, now Patent No. 2,687,954] of the above application, I have claimed approximately the same residual element ranges in heat resisting nickel-chromium-iron alloys consisting essentially of 30 to 50 percent nickel, 10 to 25 percent chromium and balance iron.

I now have found that when calcium and aluminum, as well as rare earth metals, are added to nickel-chromium alloys of the 80 percent nickel, 20 percent chromium type, which are the alloys used at maximum temperatures and under maximum service conditions, better results are obtained than if the calcium-zirconium-aluminum group or rare earths are used alone. I have also found that with the calcium-aluminum, rare earth combination I can replace nickel with as high as 8 percent iron and still maintain the improved results of the new calcium-aluminum-rare earth residual combination. Although, as the iron is increased, the useful life of the alloy decreases, the alloy with the maximum iron indicated shows a considerable improvement over the alloy containing the former calcium-aluminum-zirconium combination with no iron added. I have also found that when the melting conditions are such that a gaseous condition occasionally results in the ingot, the addition of a very small quantity of zirconium is advantageous, leaving a residual of approximately .05 percent zirconium. When the melting conditions are such that a gaseous condition does not occur, the addition of zirconium is not necessary to obtain sound metal. The present invention is, therefore, directed to the addition of small quantities of rare earth metals, calcium, aluminum and as high as 8 percent iron, to nickel-chromium alloys. I have found that such a combination of addition elements greatly increases the period of life of this type of alloy when employed under conditions where it is subjected to high temperature.

In the 80–20 nickel chromium alloys efforts heretofore have been made to keep the iron content as low as possible. The industry specifications call for a maximum of one percent and alloys containing greater amounts of iron have been considered undesirable. The average analysis has been of the order of 0.4 percent to 0.5 percent iron. It has been common experience that alloys of this type containing more than one percent of iron are definitely inferior to the alloys containing the lowest possible percentage of iron. However, as stated above, I now have found that a maximum of one percent of iron may be exceeded if the residual elements of this invention are added and retained in the amounts disclosed.

The average useful life of the best grade of 80 nickel, 20 chromium alloy up to the present time is of the order of 200 hours when the alloys are tested at a temperature of 2150° F. I have found that when proper additions of rare earth metals are made to nickel-chromium alloys containing calcium, aluminum, and possibly iron up to 8 percent, the useful life is considerably improved. Thus, an increase of approximately 50 to 100 percent in resistance to oxidation is obtained which was not to be expected in view of the past experience with alloys of this type, especially if such quantities of iron are present. The rare earth metals may be added as "misch metal," having approximate composition of 45 percent cerium, 30 percent lanthanum, 20 percent ytterbium and didymium. Although it is convenient to add rare earth metals in the form of "misch metal," I do not restrict myself to the use of this material as one or more of the rare earth metals may be added singly and its effect is of a similar nature or they may be added as oxides or salts of the rare earth metals with a reducing agent to convert them to metal in the melting operation.

In carrying out the invention, misch metal, calcium, and aluminum, with or without iron, silicon or manganese, may be added to nickel-chromium alloys. The proportion of nickel and chromium in the alloys may be varied. Thus, the chromium content may be from 10 to 30 percent. I find it advantageous to employ substantially these proportions of chromium with iron, if used, misch metal, calcium and aluminum. The alloy may also contain small quantities of manganese, silicon and carbon.

In preparing the alloys containing the addition elements enumerated, the quantities of the addition elements are subtracted from the nickel content. For example, when iron, misch metal, calcium and aluminum, are added to an alloy containing 10 to 30 percent chromium and the balance nickel, the final alloy will contain 10 to 30 percent chromium, rare earth metals, calcium, aluminum, silicon, manganese and iron, in the percentages hereinafter stated, and the balance nickel. The proportions of iron, if used, rare earth metals, calcium and aluminum may vary within certain limits. The range of proportions in which I have found the best results to be obtained are as follows:

| | Percent |
|---|---|
| Rare earth metals | Tr.–0.50 |
| Iron | Nil–8.00 |
| Aluminum | 0.01–1.00 |
| Calcium | 0.01–0.20 |
| Zirconium | Nil–0.30 |
| Manganese | 0.01–4.00 |
| Silicon | 0.01–3.00 |
| Carbon | 0.25 max. |

The preferred proportion of the finished alloys appear as follows:

| | Percent |
|---|---|
| Rare earth metals | Tr.–0.20 |
| Iron | Tr.–5.00 |
| Silicon | 0.20–2.00 |
| Calcium | 0.02–0.07 |
| Aluminum | 0.07–0.40 |
| Manganese | 0.05–1.00 |
| Carbon | 0.02–0.15 |
| Chromium | 18.00–22.00 |
| Nickel | Balance |

When adding the rare earth metals to the molten bath it is necessary to add a considerably larger percentage than is expected to be found in the cast metal. These rare earths vaporize readily and pass out of the bath. Therefore, only a spectrographic trace of one or more of the rare earth metals may be found in the cast material. However, the presence of this residue in combination with calcium and aluminum greatly increases the oxidation resistance of a nickel-chromium alloy although containing possible higher iron than heretofore. I may add sufficient rare earth metals to give a residue in the cast material up to 0.20 percent. Nickel-chromium alloys containing the above ingredients within the proportions given have been found by test to have an increased period of life when exposed to high temperatures. In determining the oxidation resistance of an alloy, wire is produced, drawn to a diameter of approximately 0.025" and tested in accordance with the method approved by the American Society for Testing Materials, Accelerated Life Test for Metallic Materials, B–76–39 at a temperature of 2150° F. The "useful life" in such tests is the time elapsed from the beginning of the test in which the electrical resistance of the alloy increases by 10 percent. The life of the tested specimen to burn-out is known as "total life."

The alloy is prepared in the usual manner by placing the ingredients in a furnace and heating until the alloy elements become molten, and then pouring.

I claim:

1. A nickel-chromium alloy of the 80% nickel 20% chromium type having a greater tolerance for iron without materially affecting its resistance to oxidation at elevated temperatures consisting of about 20% chromium, from 0.2% to 2% of silicon, from 0.05% to 1% manganese, from 0.02% to 0.25% carbon, from 0.1% to 1% aluminum, from 0.01% to 0.2% calcium, a trace to 0.5% of at least one rare earth metal, and the balance nickel.

2. A nickel-chromium alloy of the 80% nickel 20% chromium type having a greater tolerance for iron without materially affecting its resistance to oxidation at elevated temperatures consisting of about 20% chromium, from 0.2% to 2% silicon, from 0.05% to 1% manganese, from 0.02% to 0.15% carbon, from 0.07% to 0.4% aluminum, about 0.04% calcium, a trace to 0.2% of at least one rare earth metal, and the balance nickel.

3. A nickel-chromium alloy as set forth in claim 1 in which the rare earth metal is selected from the group consisting of cerium and lanthanum.

*4. An electric resistance element of the 80% nickel 20% chromium type having a greater tolerance for iron without materially affecting its resistance to oxidation at elevated temperatures consisting of about 20% chromium, from 0.2% to 2% of silicon, from 0.05% to 1% manganese, from 0.02% to 0.25% carbon, from 0.1% to 1% aluminum, from 0.01% to 0.2% calcium, a trace to 0.5% of at least one rare earth metal, and the balance nickel.*

*5. An electric resistance element of the 80% nickel 20% chromium tpe having a greater tolerance for iron without materially affecting its resistance to oxidation at elevated temperatures consisting of about 20% chromium, from 0.2% to 2% silicon, from 0.05% to 1% manganese, from 0.02% to 0.15% carbon, from 0.07% to 0.4% aluminum, about 0.04% calcium, a trace to 0.2% of at least one rare earth metal, and the balance nickel.*

*6. An electric resistance element as set forth in claim 4 in which the rare earth metal is selected from the group consisting of cerium and lanthanum.*

References Cited in the file of this patent or the original patent

UNITED STATES PATENTS

| | | |
|---|---|---|
| 2,005,431 | Lohr | June 18, 1935 |
| 2,005,433 | Lohr | June 18, 1935 |
| 2,047,916 | Lohr | July 14, 1936 |
| 2,047,917 | Lohr | July 14, 1936 |
| 2,047,918 | Lohr | July 14, 1936 |
| 2,460,590 | Lohr | Feb. 1, 1949 |
| 2,581,420 | Lohr | Jan. 8, 1952 |

FOREIGN PATENTS

| | | |
|---|---|---|
| 48,507 | France (Addition to No. 770,112) | Mar. 8, 1938 |
| 488,926 | Great Britain | July 12, 1938 |